United States Patent
Lee et al.

(10) Patent No.: US 11,792,765 B2
(45) Date of Patent: Oct. 17, 2023

(54) METHOD FOR MEASURING POSITION OF TERMINAL IN WIRELESS COMMUNICATION SYSTEM AND TERMINAL

(71) Applicant: LG ELECTRONICS INC., Seoul (KR)

(72) Inventors: Seungmin Lee, Seoul (KR); Hyukjin Chae, Seoul (KR); Woo Suk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 17/424,633

(22) PCT Filed: Jan. 31, 2020

(86) PCT No.: PCT/KR2020/001528
§ 371 (c)(1),
(2) Date: Jul. 21, 2021

(87) PCT Pub. No.: WO2020/159312
PCT Pub. Date: Aug. 6, 2020

(65) Prior Publication Data
US 2022/0086794 A1    Mar. 17, 2022

(30) Foreign Application Priority Data

Feb. 1, 2019  (KR) .......................... 10-2019-0014126
Feb. 1, 2019  (KR) .......................... 10-2019-0014127
Feb. 1, 2019  (KR) .......................... 10-2019-0014132

(51) Int. Cl.
*H04W 64/00*    (2009.01)

(52) U.S. Cl.
CPC ................................ *H04W 64/006* (2013.01)

(58) Field of Classification Search
CPC ... H04W 64/00; H04W 24/10; H04W 64/003; H04W 64/006; H04W 4/029; H04W 4/02;
(Continued)

(56) References Cited

U.S. PATENT DOCUMENTS

2017/0374637 A1\* 12/2017 Akkarakaran ...... H04W 64/006
2020/0137715 A1\* 4/2020 Edge ......................... G01S 5/06

FOREIGN PATENT DOCUMENTS

JP    2018136209     8/2018
KR    1020180047490  5/2018
(Continued)

OTHER PUBLICATIONS

Minsoo Jeong, et al., "Trends and Prospects of 5G Wireless Positioning Technologies and Location-Based Communication Technology," Retrieved on May 2020 DBPIA, see abstract, pp. 32-37 and figure 10.

*Primary Examiner* — Kwasi Karikari
(74) *Attorney, Agent, or Firm* — BRYAN CAVE LEIGHTON PAISNER LLP

(57) ABSTRACT

A method of measuring a location of a first user equipment (UE) in a wireless communication system includes the first UE receiving control information from at least one of a plurality of base stations and the first UE transmitting a first reference signal to the plurality of base stations based on the control information. The control information includes information indicating transmission of the first reference signal to the first UE with maximum power, and the location of the first UE is measured by the plurality of base stations based on the first reference signal.

13 Claims, 18 Drawing Sheets

(58) Field of Classification Search
CPC . H04W 72/23; H04W 72/0453; H04W 72/51; H04W 8/24; H04W 16/28; H04W 72/21; H04W 56/001; H04W 4/025; H04W 56/0065; H04W 92/18; H04W 88/02; H04W 56/006; H04W 4/33; H04W 28/0226; H04W 12/106
See application file for complete search history.

(56) References Cited

FOREIGN PATENT DOCUMENTS

| | | |
|---|---|---|
| KR | 1020180121020 | 11/2018 |
| WO | 2016200093 | 12/2016 |

* cited by examiner (a) DMRS location for Rel. 12/13 PSBCH (b) DMRS location for V2V PSBCH (a)

(b)

(a)

(b)

METHOD FOR MEASURING POSITION OF TERMINAL IN WIRELESS COMMUNICATION SYSTEM AND TERMINAL

This application is the National Stage filing under 35 U.S.C. 371 of International Application No. PCT/KR2020/001528 filed on Jan. 31, 2020, which claims priority to Korean Patent Application Nos. 10-2019-0014126 filed on Feb. 1, 2019; 10-2019-0014127 filed on Feb. 1, 2019 and 10-2019-0014132 filed on Feb. 1, 2019, the contents of which are all hereby incorporated by reference herein in their entirety.

BACKGROUND OF THE INVENTION

1. Field of the Invention

The following description relates to a wireless communication system and, more particularly, to a method of measuring a location of a user equipment (UE), and the UE.

2. Description of the Related Art

As more communication apparatuses require larger communication capacities, there is a need for improved mobile broadband communication compared to a conventional radio access technology. In addition, massive machine type communications (mMTC) for providing various services anytime anywhere by connecting a plurality of devices and things is also one of major issues to be considered in next-generation communication. In addition, communication system design considering services/UEs sensitive to reliability and latency is being discussed. Introduction of next-generation RAT considering Enhanced mobile Broadband Communication (eMBB), mMTC, Ultra-Reliable and Low Latency Communication (URLLC), etc. is being discussed. In this disclosure, this technology is referred to new radio (NR) for convenience. NR is an expression indicating an example of 5G radio access technology (RAT).

A new RAT system including NR uses an OFDM transmission method or a transmission method similar thereto. The new RAT system may follow OFDM parameters different from OFDM parameters of LTE. Alternatively, the new RAT system may follow numerology of existing LTE/LTE-A but may have a larger system bandwidth (e.g., 100 MHZ). Alternatively, one cell may support a plurality of numerologies. That is, user equipments (UEs) operating with different numerologies may coexist in one cell.

Vehicle-to-everything (V2X) means communication technology for exchanging information with other vehicles, pedestrians and things equipped with infrastructure through wired/wireless communication, and may include four types such as vehicle-to-vehicle (V2V), vehicle-to-infrastructure (V2I), vehicle-to-network (V2N) and vehicle-to-pedestrian (V2P). V2X communication may be provided through a PC5 interface and/or a Uu interface.

SUMMARY OF THE INVENTION

The present disclosure proposes a method of efficiently transmitting an uplink signal to a base station in a UTDoA-based UE positioning scheme.

The technical problems solved by the present disclosure are not limited to the above technical problems and other technical problems which are not described herein will become apparent to those skilled in the art from the following description.

A method of measuring a location of a first user equipment (UE) in a wireless communication system according to an embodiment includes the first UE receiving control information from at least one of a plurality of base stations and the first UE transmitting a first reference signal to the plurality of base stations based on the control information. The control information includes information indicating transmission of the first reference signal to the first UE with maximum power, and the location of the first UE is measured by the plurality of base stations based on the first reference signal.

A first user equipment (UE) of a wireless communication system according to an embodiment includes a transceiver and a processor. The processor is configured to receive control information from at least one of a plurality of base stations and to transmit a first reference signal to the plurality of base stations based on the control information, the control information comprises information indicating transmission of the first reference signal to the first UE with maximum power, and a location of the first UE is measured by the plurality of base stations based on the first reference signal.

Information indicating a movement speed of the first UE may be transmitted from the first UE to at least one of the plurality of base stations, and the first UE with the movement speed less than a threshold may be regarded as an anchor node by at least one of the plurality of base stations The method may further include first UE receiving a second reference from the plurality of base stations and receiving a third reference signal from a second UE, the first UE obtaining a difference between a first reception time when the second reference signal is received by the first UE and a second reception time when the third reference signal is received by the first UE, and the first UE obtaining a location of the second UE based on the difference between the first reception time and the second reception time.

The method may further include the first UE transmitting information indicating the difference between the first reception time and the second reception time to at least one of the plurality of base stations, and the location of the second UE may be obtained by the at least one base station based on the difference between the first reception time and the second reception time The number of times of transmission of the reference signal may be determined based on path loss between a preset reference cell and the first UE The plurality of base stations may include a first base station and a second base station, and information including at least one of resource for transmission of the reference signal, a reference cell identifier used to derive path loss for each resource, a reference beam identifier, a reference signal identifier or an SSB index may be transmitted from the first base station to the second base station through backhaul signaling.

At least one of time resource and frequency resource for transmission of the reference signal may be determined based on reference signal received power (RSRP) or transmit power for the reference signal The reference signal may be transmitted by the first UE in a radio resource control (RRC) idle mode.

The reference signal may be a positioning reference signal (PRS).

The first UE may communicate with at least one of a mobile terminal, a network or an autonomous vehicle other than the device.

The first UE may perform an at least one advanced driver assistance system (ADAS) function based on a signal for controlling movement of the first UE.

The first UE may receive user input and switch a driving mode of a device from an autonomous mode to a manual mode or from a manual mode to an autonomous mode The first UE may be autonomously driven based on external object information, and the external object information may include at least one of information on presence/absence of an object, location information of the object, information on a distance between the first UE and the object or information on a relative speed between the first object and the object.

An embodiment of the present disclosure proposes a method of efficiently measuring a location of a UE. In addition, an embodiment of the present disclosure provides a technical effect that a UE can (accurately/efficiently) measure the location of the UE without receiving a signal of a base station.

It will be appreciated by persons skilled in the art that that the effects that can be achieved through the present disclosure are not limited to the above-described effects and other effects which are not described herein may be understood by those skilled in the art from the following detailed description.

BRIEF DESCRIPTION OF THE DRAWINGS

The accompany drawings which are included for further understanding of the disclosure and included in this disclosure and which form part of the disclosure illustrate embodiments of the disclosure along with the detailed description that describes the principle of the disclosure.

DESCRIPTION OF THE PREFERRED EMBODIMENTS

Figure 1:
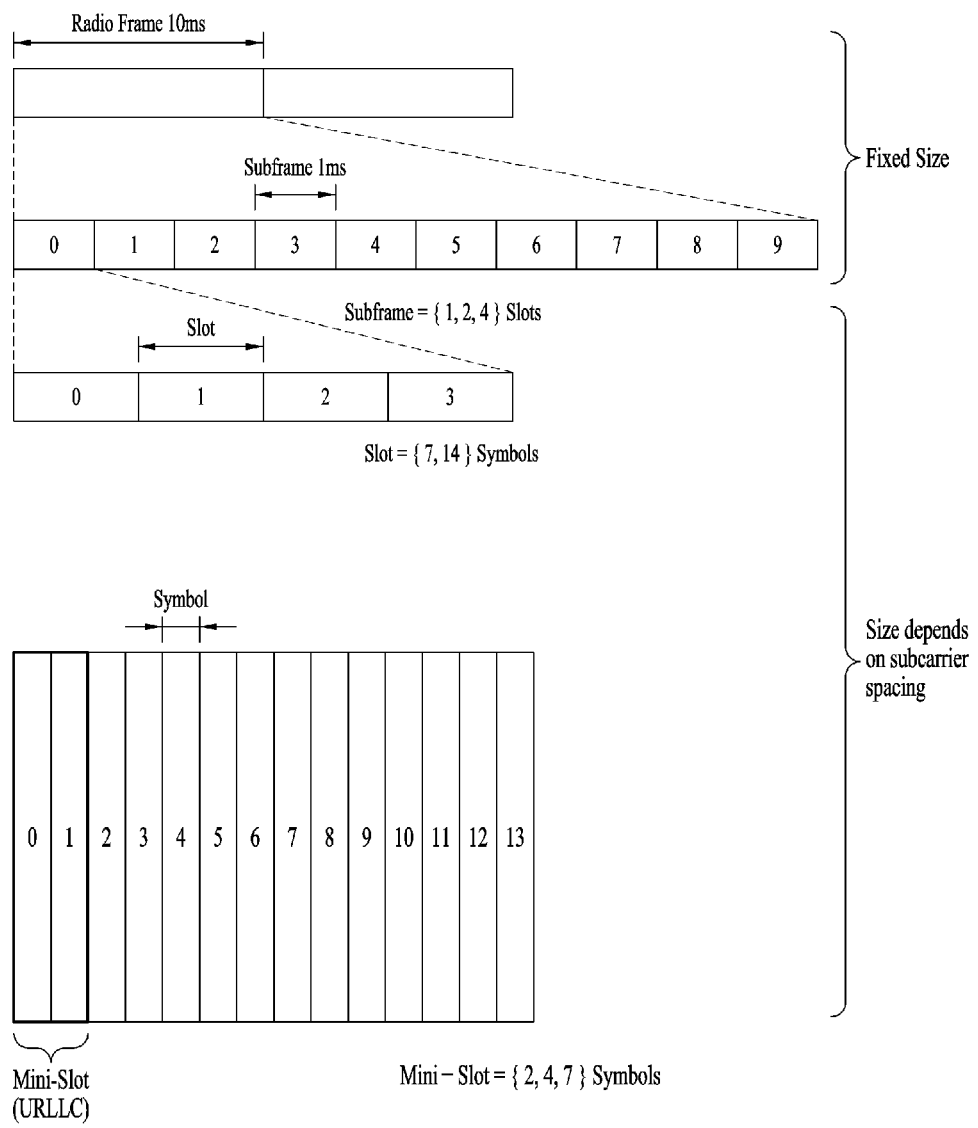
FIG. 1 is a view showing an example of a frame structure in NR.

In the disclosure, downlink (DL) refers to communication from a base station (BS) to a user equipment (UE), and uplink (UL) refers to communication from the UE to the BS. On DL, a transmitter may be a part of the BS and a receiver may be a part of the UE, whereas on UL, a transmitter may be a part of the UE and a receiver may be a part of the BS. A BS may be referred to as a first communication device, and a UE may be referred to as a second communication device in the present disclosure. The term BS may be replaced with fixed station, Node B, evolved Node B (eNB), next generation Node B (gNB), base transceiver system (BTS), access point (AP), network or 5G network node, artificial intelligence (AI) system, road side unit (RSU), robot and so on. The term UE may be replaced with terminal, mobile station (MS), user terminal (UT), mobile subscriber station (MSS), subscriber station (SS), advanced mobile station (AMS), wireless terminal (WT), device-to-device (D2D) device, vehicle, robot, AI module and so on.

The following technology may be used in various wireless access systems including code division multiple access (CDMA), frequency division multiple access (FDMA), time division multiple access (TDMA), orthogonal frequency division multiple access (OFDMA), and single carrier FDMA (SC-FDMA). CDMA may be implemented by radio technologies such as Universal Terrestrial Radio Access (UTRA) or CDMA2000. TDMA may be implemented by radio technologies such as Global System for Mobile communications (GSM)/General Packet Radio Service (GPRS)/Enhanced Data Rates for GSM Evolution (EDGE). OFDMA may be implemented by radio technologies such as IEEE 802.11 (Wi-Fi), IEEE 802.16 (WiMAX), IEEE 802-20 or E-UTRA (Evolved UTRA). UTRA is part of a Universal Mobile Telecommunications System (UMTS). 3rd Generation Partnership Project (3GPP) Long Term Evolution (LTE) is part of an Evolved UMTS (E-UMTS) using E-UTRA, and LTE-A (Advanced)/LTE-A pro is an evolved version of 3GPP LTE. New Radio or New Radio Access Technology (3GPP NR) is an evolved version of 3GPP LTE/LTE-A/LTE-A pro.

In order to clarify the description, the description is based on a 3GPP communication system (e.g., LTE-A or NR), but the technical spirit of the present disclosure is not limited thereto. LTE means technology after 3GPP TS 36.xxx Release 8. Specifically, LTE technology after 3GPP TS 36.xxx Release 10 is referred to as LTE-A and LTE technology after 3GPP TS 36.xxx Release 13 is referred to as LTE-A pro. 3GPP NR means technology after TS 38.xxx Release 15. LTE/NR may be referred to as a 3GPP system. "xxx" means a detailed standard document number. LTE/NR may be collectively referred to as a 3GPP system.

In this disclosure, a node refers to a fixed point capable of transmitting/receiving a radio signal through communication with a UE. Various types of BSs may be used as nodes regardless of the name thereof. For example, a BS, NB, eNB, pico-cell eNB (PeNB), home eNB (HeNB), relay, repeater, etc. may be a node. In addition, the node may not be a BS. For example, the node may be a radio remote head (RRH) or a radio remote unit (RRU). The RRH, the RRU, etc. generally have lower power levels than the BS. At least one antenna is installed in one node. The antenna may mean a physical antenna or may mean an antenna port, a virtual antenna or an antenna group. The node may be referred to as a point.

In the present disclosure, a cell may refer to a certain geographical area or radio resources, in which one or more nodes provide a communication service. A "cell" as a geographical area may be understood as coverage in which a service may be provided in a carrier, while a "cell" as radio resources is associated with the size of a frequency configured in the carrier, that is, a bandwidth (BW). Because a range in which a node may transmit a valid signal, that is, DL coverage and a range in which the node may receive a valid signal from a UE, that is, UL coverage depend on a carrier carrying the signals, and thus the coverage of the node is associated with the "cell" coverage of radio resources used by the node. Accordingly, the term "cell" may mean the service overage of a node, radio resources, or a range in which a signal reaches with a valid strength in the radio resources, under circumstances.

In the present disclosure, communication with a specific cell may amount to communication with a BS or node that provides a communication service to the specific cell. Further, a DL/UL signal of a specific cell means a DL/UL signal from/to a BS or node that provides a communication service to the specific cell. Particularly, a cell that provides a UL/DL communication service to a UE is called a serving cell for the UE. Further, the channel state/quality of a specific cell refers to the channel state/quality of a channel or a communication link established between a UE and a BS or node that provides a communication service to the specific cell.

A "cell" associated with radio resources may be defined as a combination of DL resources and UL resources, that is, a combination of a DL component carrier (CC) and a UL CC. A cell may be configured with DL resources alone or both DL resources and UL resources in combination. When carrier aggregation (CA) is supported, linkage between the carrier frequency of DL resources (or a DL CC) and the carrier frequency of UL resources (or a UL CC) may be indicated by system information transmitted in a corresponding cell. A carrier frequency may be identical to or different from the center frequency of each cell or CC. Hereinbelow, a cell operating in a primary frequency is referred to as a primary cell (Pcell) or PCC, and a cell operating in a secondary frequency (or SCC) is referred to as a secondary cell (Scell) or SCC. The Scell may be configured after a UE and a BS perform a radio resource control (RRC) connection establishment procedure and thus an RRC connection is established between the UE and the BS, that is, the UE is RRC_CONNECTED. The RRC connection may mean a path in which the RRC of the UE may exchange RRC messages with the RRC of the BS. The Scell may be configured to provide additional radio resources to the UE. The Scell and the Pcell may form a set of serving cells for the UE according to the capabilities of the UE. Only one serving cell configured with a Pcell exists for an RRC_CONNECTED UE which is not configured with CA or does not support CA.

A cell supports a unique radio access technology (RAT). For example, LTE RAT-based transmission/reception is performed in an LTE cell, and 5G RAT-based transmission/reception is performed in a 5G cell.

CA aggregates a plurality of carriers each having a smaller system BW than a target BW to support broadband. CA differs from OFDMA in that DL or UL communication is conducted in a plurality of carrier frequencies each forming a system BW (or channel BW) in the former, and DL or UL communication is conducted by loading a basic frequency band divided into a plurality of orthogonal subcarriers in one carrier frequency in the latter. In OFDMA or orthogonal frequency division multiplexing (OFDM), for example, one frequency band having a certain system BW is divided into a plurality of subcarriers with a predetermined subcarrier spacing, information/data is mapped to the plurality of subcarriers, and the frequency band in which the information/data has been mapped is transmitted in a carrier frequency of the frequency band through frequency upconversion. In wireless CA, frequency bands each having a system BW and a carrier frequency may be used simultaneously for communication, and each frequency band used in CA may be divided into a plurality of subcarriers with a predetermined subcarrier spacing.

The 3GPP communication standards define DL physical channels corresponding to resource elements (REs) conveying information originated from upper layers of the physical layer (e.g., the medium access control (MAC) layer, the radio link control (RLC) layer, the packet data convergence protocol (PDCP) layer, the radio resource control (RRC) layer, the service data adaptation protocol (SDAP) layer, and the non-access stratum (NAS) layer), and DL physical signals corresponding to REs which are used in the physical layer but do not deliver information originated from the upper layers. For example, physical downlink shared channel (PDSCH), physical broadcast channel (PBCH), physical multicast channel (PMCH), physical control format indicator channel (PCFICH), and physical downlink control channel (PDCCH) are defined as DL physical channels, and a reference signal (RS) and a synchronization signal are defined as DL physical signals. An RS, also called a pilot is a signal in a predefined special waveform known to both a BS and a UE. For example, cell specific RS (CRS), UE-specific RS (UE-RS), positioning RS (PRS), channel state information RS (CSI-RS), and demodulation RS (DMRS) are defined as DL RSs. The 3GPP communication standards also define UL physical channels corresponding to REs conveying information originated from upper layers, and UL physical signals corresponding to REs which are used in the physical layer but do not carry information originated from the upper layers. For example, physical uplink shared channel (PUSCH), physical uplink control channel (PUCCH), and physical random access channel (PRACH) are defined as UL physical channels, and DMRS for a UL control/data signal and sounding reference signal (SRS) used for UL channel measurement are defined.

In this disclosure, a physical downlink control channel (PDCCH) and a physical downlink shared channel (PDSCH) may mean a set of time-frequency resources or a set of resource elements carrying downlink control information (DCI) and downlink data of a physical layer. In addition, a physical uplink control channel, a physical uplink shared channel (PUSCH) and a physical random access channel means a set of time-frequency resources or a set of resource elements carrying uplink control information (UCI), uplink data and random access signals of a physical layer. Hereinafter, a UE transmitting an uplink physical channel (e.g., PUCCH, PUSCH or PRACH) may mean that DCI, uplink data or random access signals are transmitted over or through the uplink physical channel A BS receiving an uplink physical channel may mean that DCI, uplink data or random access signals are received over or through the uplink physical channel. A BS transmitting a downlink physical channel (e.g., PDCCH or PDSCH) is used as the same meaning as transmission of DCI or uplink data over or through the downlink physical channel A UE receiving a downlink physical channel may mean that DCI or uplink data is received over or through the downlink physical channel.

In this disclosure, a transport block is a payload for a physical layer. For example, data given to a physical layer from a higher layer or a medium access control (MAC) layer is basically referred to as a transport block.

In the present disclosure, HARQ is a kind of error control technique. A HARQ-ACK transmitted on DL is used for error control of UL data, and a HARQ-ACK transmitted on UL is used for error control of DL data. A transmitter performing an HARQ operation awaits reception of an ACK after transmitting data (e.g., a TB or a codeword). A receiver performing an HARQ operation transmits an ACK only when data has been successfully received, and a negative ACK (NACK) when the received data has an error. Upon receipt of the ACK, the transmitter may transmit (new) data, and upon receipt of the NACK, the transmitter may retransmit the data. Time delay occurs until ACK/NACK is received from a UE and retransmission data is transmitted after the BS transmits scheduling information and data according to the scheduling information. Such time delay occurs due to channel propagation delay or a time required to decode/encode data. Accordingly, when new data is transmitted after a HARQ process which is currently in progress is finished, a gap occurs in data transmission due to time delay. Accordingly, a plurality of independent HARQ processes is used to prevent a gap from occurring in data transmission during a time delay period. For example, when there are seven transmission occasions between initial transmission and retransmission, a communication device may perform data transmission without a gap by performing seven independent HARQ processes. When a plurality of parallel HARQ processes is used, UL/DL transmission may be continuously performed while waiting for HARQ feedback for previous UL/DL transmission.

In the present disclosure, CSI generically refers to information representing the quality of a radio channel (or link) established between a UE and an antenna port. The CSI may include at least one of a channel quality indicator (CQI), a precoding matrix indicator (PMI), a CSI-RS resource indicator (CRI), a synchronization signal block resource indicator (SSBRI), a layer indicator (LI), a rank indicator (RI), or a reference signal received power (RSRP).

In the present disclosure, frequency division multiplexing (FDM) is transmission/reception of signals/channels/users in different frequency resources, and time division multiplexing (TDM) is transmission/reception of signals/channels/users in different time resources.

In the present disclosure, frequency division duplex (FDD) is a communication scheme in which UL communication is performed in a UL carrier, and DL communication is performed in a DL carrier linked to the UL carrier, whereas time division duplex (TDD) is a communication scheme in which UL communication and DL communication are performed in time division in the same carrier.

For background technologies, terms, abbreviations used in this disclosure, refer to matters described in the standard documents published prior to the present disclosure. For example, documents corresponding to 3GPP TS 36, 24 and 38 series (http://www.3gpp.org/specifications/specification-numbering) may be referred to.

Frame Structure

FIG. 1 is a view showing an example of a frame structure in NR.

The NR system may support a plurality of numerologies. Here, the numerology may be defined by a subcarrier spacing and cyclic prefix (CP) overhead. At this time, a plurality of subcarrier spacings may be derived by scaling a basic subcarrier spacing with an integer N (or µ). In addition, even if it is assumed that a very low subcarrier spacing is not used in a very high carrier frequency, a used numerology may be selected independently of the frequency band of a cell. In addition, in the NR system, various frame structures according to the plurality of numerologies may be supported.

Hereinafter, an orthogonal frequency division multiplexing (OFDM) numerology and a frame structure which may be considered in the NR system will be described. The plurality of OFDM numerologies supported in the NR system may be defined as shown in Table 1. µ and cyclic prefix for a bandwidth part are obtained from RRC parameters provided by the BS.

TABLE 1

| µ | $\Delta f = 2^\mu * 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports the plurality of numerologies (e.g., subcarrier spacings) supporting various 5G services. For example, when the subcarrier spacing is 15 kHz, a wide area in traditional cellular bands is supported. When the subcarrier spacing is 30 kHz/60 kHz, dense-urban, lower latency and wider carrier bandwidth are supported. When the subcarrier spacing is equal to or higher than 60 kHz, bandwidth greater than 24.25 GHz is supported to overcome phase noise.

Resource Grid

Figure 2:
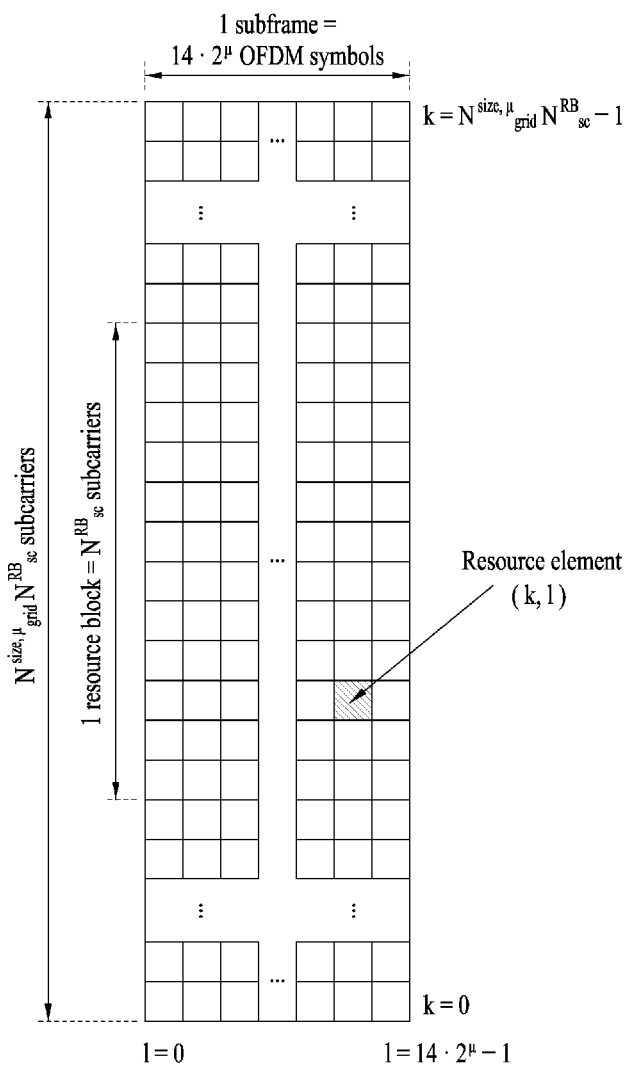
FIG. 2 is a view showing an example of a resource grid in NR.

FIG. 2 is a view showing an example of a resource grid in NR.

Referring to FIG. 2, for each subcarrier spacing setting and carrier, a resource grid of $N^{size,\mu}_{grid} * N^{RB}_{sc}$ subcarriers and $14 \cdot 2^\mu$ OFDM symbols is defined. Here, $N^{size,\mu}_{grid}$ is indicated by RRC signaling from the BS. $N^{size,\mu}_{grid}$ may vary according to uplink and downlink as well as the subcarrier spacing setting µ. There is one resource grid for subcarrier spacing setting µ, antenna port p and a transmission direction (uplink or downlink). Each element of the resource grid for subcarrier spacing setting µ and antenna port p is referred to as a resource element and is uniquely identified by an index pair (k,l). Here, k denotes an index in a frequency domain and l denotes a symbol location in the frequency domain relative to a reference point. A resource element (k,l) for subcarrier spacing setting µ and antenna port p correspond to physical resource and complex value $a^{(p,\mu)}_{k,l}$. A resource block (RB) is defined by $N^{RB}_{sc}=12$ consecutive subcarriers in the frequency domain.

Considering that the UE cannot support a wide bandwidth to be supported in the NR system at once, the UE may be configured to operate in a part of the frequency bandwidth of the cell (hereinafter referred to as a bandwidth part (BWP)).

Bandwidth Part (BWP)

In the NR system, up to 400 MHz may be supported per carrier. If a UE operating in such a wideband carrier operates in a state in which a radio frequency (RF) module for the entire carrier is always turned on, UE battery consumption may increase. Alternatively, considering various use cases (e.g., eMBB, URLLC, mMTC, V2X, etc.) in which the UE operates in one wideband carrier, different numerologies (e.g., subcarrier spacings) may be supported for each frequency band in the carrier. Alternatively, capabilities for maximum bandwidth may vary according to UE. In consideration of this, the BS may instruct the UE to operate in a partial bandwidth rather than the entire bandwidth of the wideband carrier, and the partial bandwidth may be referred to as a bandwidth part (BWP). In the frequency domain, the BWP is a subset of contiguous common resource blocks defined for numerology μi in the bandwidth part i on the carrier, and one numerology (e.g., a subcarrier spacing, a CP length, a slot/mini-slot duration) may be set.

Meanwhile, the BS may set one or more BWPs in one carrier set for the UE. Alternatively, when UEs are concentrated on a specific BWP, some UEs may move to another BWP for load balancing. Alternatively, in consideration of frequency domain inter-cell interference cancellation between neighbor cells, some spectrums of the entire bandwidth may be excluded and both BWPs of a cell may be set in the same slot. That is, the BS may set at least one DL/UL BWP for a UE associated with the wideband carrier, and at least one of DL/UL BWP(s) set at a specific time may be activated (by L1 signaling which is a physical layer control signal, a MAC control element (CE) which is a MAC layer control signal, or RRC signaling), switching to another set DL/UL BWP may be indicated (by L1 signaling, MAC CE, or RRC signaling), or a timer value may be set to switch a DL/UL BWP determined by the UE when the timer expires. The activated DL/UL BWP is particularly referred to an active DL/UL BWP. When the UE is in an initial access process or before RRC connection of the UE is established, the UE may not receive a configuration for the DL/UL BWP. In this situation DL/UL BWP assumed by the UE may be referred to as an initial active DL/UL BWP.

Synchronization Acquisition of Sidelink UE

In a time division multiple access (TDMA) and frequency division multiples access (FDMA) system, accurate time and frequency synchronization is essential. When time and frequency synchronization is not accurate, inter-symbol interference (ISI) and intercarrier interference (ICI) are caused, thereby deteriorating system performance. The same is true in V2X. In V2X, for time/frequency synchronization, a sidelink synchronization signal (SLSS) may be used in a physical layer and master information block-sidelink-V2X (MIB-SL) may be used in a radio link control (RLC) layer.

Figure 3:
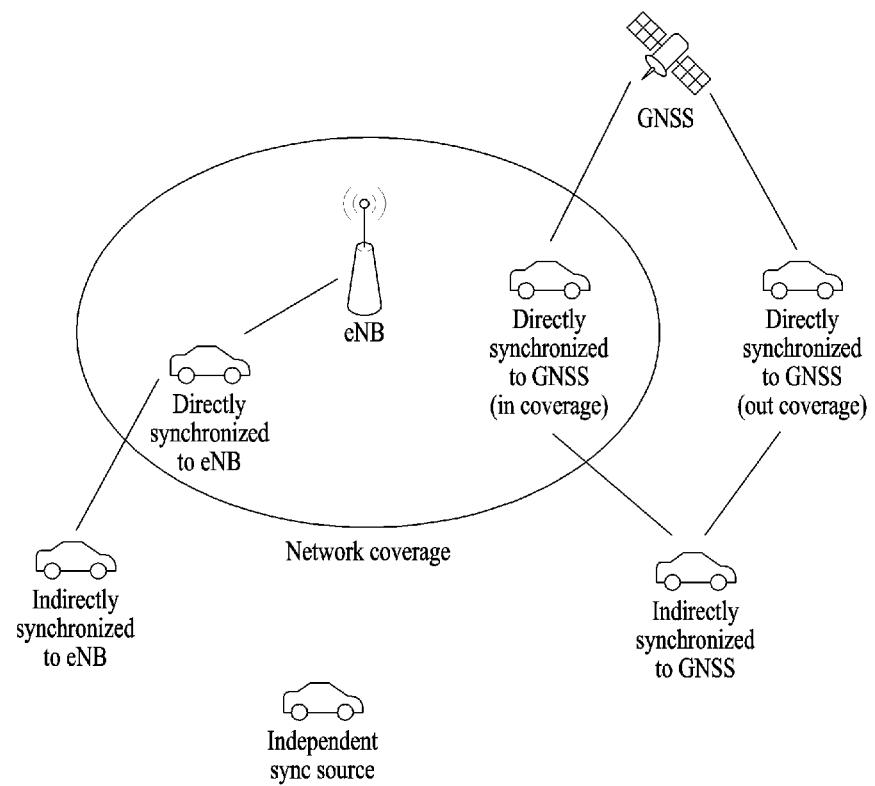
FIG. 3 is a view illustrating sidelink synchronization.

FIG. 3 is a view showing an example of a source of synchronization or a criterion of synchronization in V2X.

As shown in FIG. 3, in V2X, a UE may be directly synchronized to a global navigation satellite systems (GNSS) or may be indirectly synchronized to the GNSS through a UE directly synchronized to the GNSS (inside network coverage or outside network coverage). When the GNSS is set as a synchronization source, the UE may calculate a direct frame number (DFN) and a subframe number using coordinated universal time (UTC) and a (pre)determined DFN offset.

Alternatively, the UE may be directly synchronized to an eNB or may be synchronized to another UE time/frequency-synchronized to the eNB. For example, when the UE is located inside network coverage, the UE may receive synchronization information provided by the eNB and may be directly synchronized to the eNB. Thereafter, synchronization information may be provided to another adjacent UE. When eNB timing is set as a criterion of synchronization, for synchronization and downlink measurement, the UE may follow a cell associated with a corresponding frequency (when being inside cell coverage at the frequency) and a primary cell or a serving cell (when being outside cell coverage at the frequency).

The eNB (serving cell) may provide synchronization setting for a carrier used for V2X sidelink communication. In this case, the UE may follow synchronization setting received from the eNB. If no cell is detected in the carrier used for V2X sidelink communication and synchronization setting is not received from the serving cell, the UE may follow preset synchronization setting.

Alternatively, the UE may be synchronized to another UE which does not directly or indirectly acquire synchronization information from the eNB or the GNSS. The source and preference of synchronization may be pre-set for the UE or may be set through a control message provided by the eNB.

Now, a synchronization signal (SLSS) and synchronization information will be described.

The SLSS is a sidelink-specific sequence and may include a primary sidelink synchronization signal (PSSS) and a secondary sidelink synchronization signal (SSSS).

Each SLSS may have a physical layer sidelink synchronization Identity (ID) and the value thereof may be any one of 0 to 335. The synchronization source may be identified according to which of the above-described values is used. For example, 0, 168 and 169 may mean the GNSS, 1 to 167 may mean the eNB, and 170 to 335 may mean the outside of coverage. Alternatively, among the values of the physical layer sidelink synchronization ID, 0 to 167 may be values used by a network and 168 to 335 may be values used outside network coverage.

Figure 4:
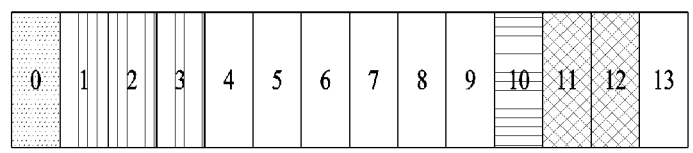
FIG. 4 is a view showing a time resource unit in which a sidelink synchronization signal is transmitted.
Figure 4:
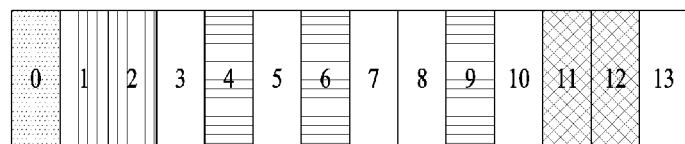
Figure 4:
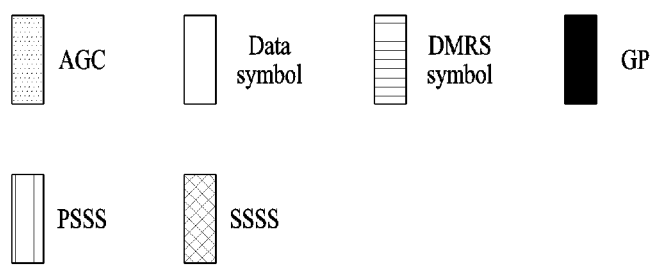

FIG. 4 is a view showing a time resource unit in which a sidelink synchronization signal is transmitted. Here, the time resource unit may mean a subframe in LTE/LTE-A and a slot in 5G, details of which are disclosed in 3GPP TS 36 series or 38 series. A physical sidelink broadcast channel (PSBCH) may be a channel in which basic (system) information, which should be first known to the UE before sidelink signal transmission/reception (e.g., information related to the SLSS, a duplex mode (DM), a TDD UL/DL configuration, resource pool related information, the type of an application related to the SLSS, a subframe offset, broadcast information, etc.) is transmitted (broadcast). The PSBCH may be transmitted in the same time resource unit as the SLSS or a subsequent time resource unit. The DMRS may be used for demodulation of the PSBCH.

Sidelink Transmission Mode

In sidelink, there are transmission modes 1, 2, 3 and 4.

In transmission mode 1/3, an eNB performs resource scheduling through a PDCCH (more specifically, DCI) with respect to a UE 1, and the UE 1 performs D2D/V2X communication with a UE 2 according to the resource scheduling. The UE 1 may transmit sidelink control information (SCI) to the UE 2 through a physical sidelink control channel (PSCCH) and then transmit data based on the SCI through a physical sidelink shared channel (PSSCH). Transmission mode 1 is applicable to D2D and transmission mode 3 is applicable to V2X.

Transmission mode 2/4 may be a mode in which a UE performs scheduling by itself. More specifically, transmission mode 2 is applicable to D2D and a UE may select resources by itself in a set resource pool to perform D2D operation. Transmission mode 4 is applicable to V2X and a UE may select resources by itself within a selection window through a sensing process and then perform V2X operation. The UE 1 may transmit SCI to the UE 2 through a PSCCH and then transmit data based on the SCI through a PSSCH. Hereinafter, the transmission mode may be briefly referred to as a mode.

Control information transmitted from the eNB to the UE through the PDCCH may be referred to as downlink control information (DCI) and control information transmitted from the UE to another UE through a PSCCH may be referred to as SCI. The SCI may deliver sidelink scheduling information. The SCI may have various formats, for example, SCI format 0 and SCI format 1.

SCI format 0 may be used for scheduling of the PSSCH. SCI format 0 may include a frequency hopping flag (1 bit), a resource block allocation and hopping resource allocation field (the number of bits may vary depending on the number of resource blocks of sidelink), a time resource pattern (7 bits), modulation and coding scheme (MCS) (5 bits), time advance indication (11 bits), a group destination ID (8 bits), etc.

SCI format may be used for scheduling of the PSSCH. SCI format 1 includes priority (3 bits), resource reservation (4 bits), frequency resource locations of initial transmission and retransmission (the number of bits may vary according to the number of subchannels of sidelink), a time gap between initial transmission and retransmission (4 bits), MCS (5 bits), a retransmission index (1 bit), reserved information bit, etc. Hereinafter, the reserved information bit may be briefly referred to as a reserved bit. The reserved bit may be added until the bit size of SCI format 1 becomes 32 bits.

SCI format 0 may be used in transmission modes 1 and 2 and SCI format 1 may be used in transmission modes 3 and 4.

Sidelink Resource Pool

Figure 5:
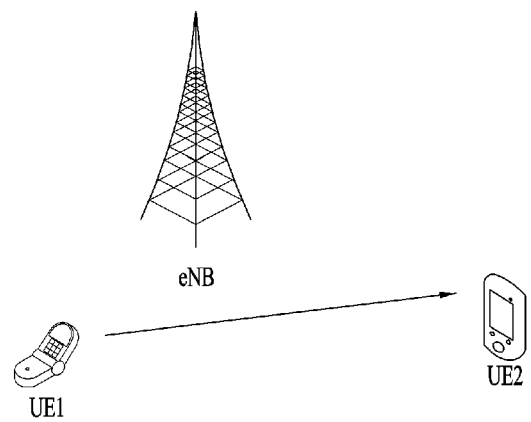
FIG. 5 is a view showing an example of a sidelink resource pool.
Figure 5:
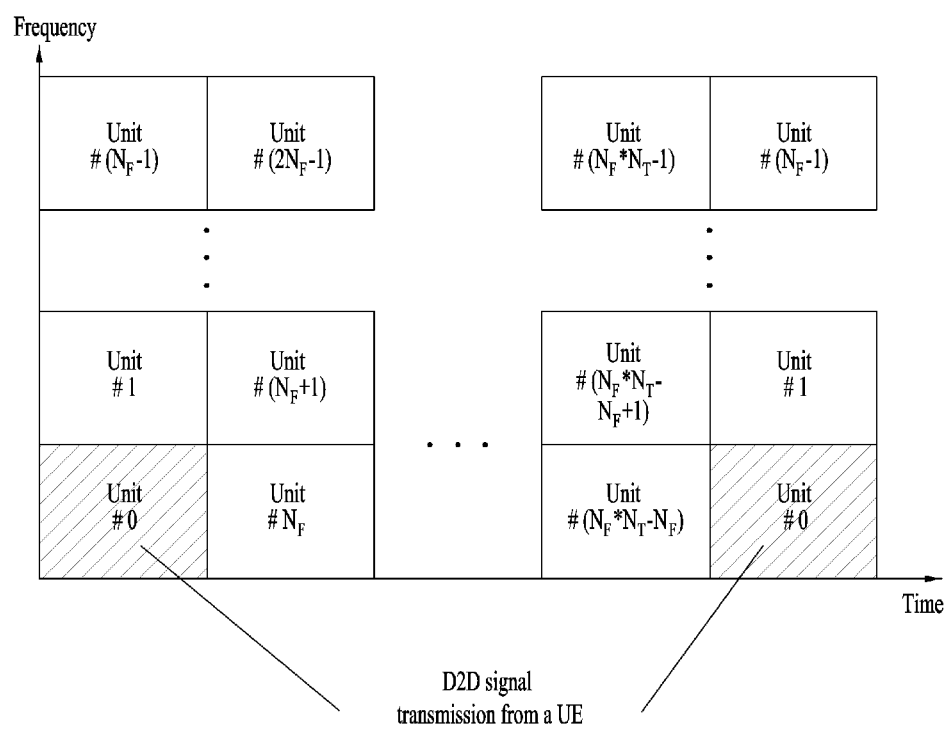

FIG. 5 shows an example of a first UE (UE1), a second UE (UE2) and a resource pool used by UE1 and UE2 performing sidelink communication.

In FIG. 5(a), a UE corresponds to a terminal or such a network device as an eNB transmitting and receiving a signal according to a sidelink communication scheme. A UE selects a resource unit corresponding to a specific resource from a resource pool corresponding to a set of resources and the UE transmits a sidelink signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB may inform UE1 of the resource pool. If UE1 is located at the outside of coverage of the eNB, the resource pool may be informed by a different UE or may be determined by a predetermined resource. In general, a resource pool includes a plurality of resource units. A UE selects one or more resource units from among a plurality of the resource units and may be able to use the selected resource unit(s) for sidelink signal transmission. FIG. 5(b) shows an example of configuring a resource unit. Referring to FIG. 5(b), the entire frequency resources are divided into the NF number of resource units and the entire time resources are divided into the NT number of resource units. In particular, it is able to define NF*NT number of resource units in total. In particular, a resource pool may be repeated with a period of NT time resource units. Specifically, as shown in FIG. 5, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a sidelink signal.

A resource pool may be classified into various types. First of all, the resource pool may be classified according to contents of a sidelink signal transmitted via each resource pool. For example, the contents of the sidelink signal may be classified into various signals and a separate resource pool may be configured according to each of the contents. The contents of the sidelink signal may include a scheduling assignment (SA or physical sidelink control channel (PSCCH)), a sidelink data channel, and a discovery channel. The SA may correspond to a signal including information on a resource position of a sidelink data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with sidelink data. In this case, an SA resource pool may correspond to a pool of resources that an SA and sidelink data are transmitted in a manner of being multiplexed. The SA signal may also be referred to as a sidelink control channel or a physical sidelink control channel (PSCCH). The sidelink data channel (or, physical sidelink shared channel (PSSCH)) corresponds to a resource pool used by a transmitting UE to transmit user data. If an SA and a sidelink data are transmitted in a manner of being multiplexed in an identical resource unit, sidelink data channel except SA information may be transmitted only in a resource pool for the sidelink data channel In other word, REs, which are used to transmit SA information in a specific resource unit of an SA resource pool, may also be used for transmitting sidelink data in a sidelink data channel resource pool. The discovery channel may correspond to a resource pool for a message that enables a neighboring UE to discover transmitting UE transmitting information such as ID of the UE, and the like.

Although contents of sidelink signal are identical to each other, it may use a different resource pool according to a transmission/reception attribute of the sidelink signal. For example, in case of the same sidelink data channel or the same discovery message, the sidelink data channel or the discovery signal may be classified into a different resource pool according to a transmission timing determination scheme (e.g., whether a sidelink signal is transmitted at the time of receiving a synchronization reference signal or the timing to which a prescribed timing advance is added) of a sidelink signal, a resource allocation scheme (e.g., whether a transmission resource of an individual signal is designated by an eNB or an individual transmitting UE selects an individual signal transmission resource from a pool), a signal format (e.g., number of symbols occupied by a sidelink signal in a time resource unit, number of time resource units used for transmitting a sidelink signal), signal strength from an eNB, strength of transmit power of a sidelink UE, and the like. For clarity, a method for an eNB to directly designate a transmission resource of a sidelink transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing sidelink discovery, if an eNB directly indicates a resource, it is referred to as a type 2. If a UE directly selects a transmission resource from a predetermined resource region or a resource region indicated by the eNB, it is referred to as type 1.

In V2X, sidelink transmission mode 3 based on centralized scheduling and sidelink transmission mode 4 based on distributed scheduling are available.

Figure 6:
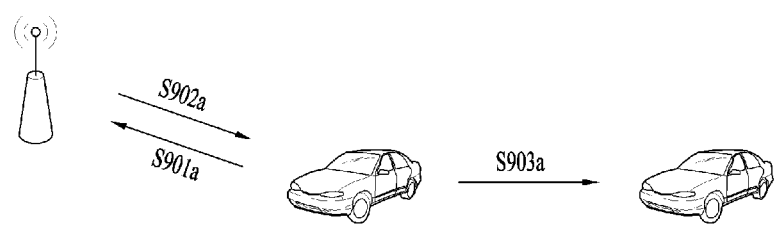
FIG. 6 is a diagram illustrating scheduling schemes according to sidelink transmission modes.
Figure 6:
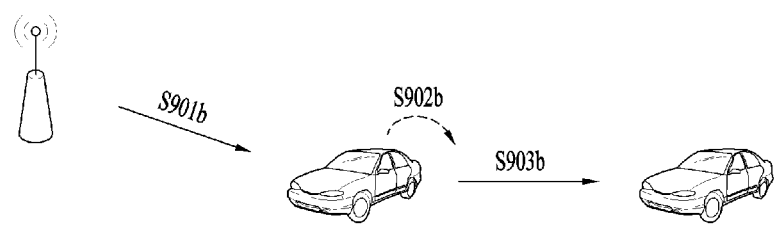

FIG. 6 illustrates scheduling schemes according to these two transmission modes. Referring to FIG. 6, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 6(b), a vehicle selects transmission resources (S902b), while sensing resources preconfigured by the eNB, that is, a resource pool (S901b), and then transmits a signal in the selected resources to another vehicle (S903b).

Figure 7:
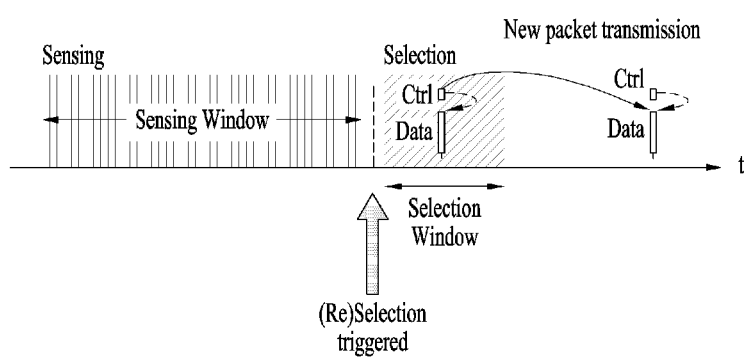
FIG. 7 is a view showing selection of sidelink transmission resources.

At this time, as shown in FIG. 7, in selection of transmission resources, a method of reserving transmission resources of a next packet is used. In V2X, transmission is performed twice for each MAC PDU and resources for retransmission are reserved at a certain time gap when resources for initial transmission are selected. A UE may grasp transmission resources reserved by other UEs or resources used by other UEs through sensing in a sensing window and randomly select resources from resources with little interference among the remaining resources after excluding the used resources from the selection window.

For example, the UE may decode a PSCCH including information on the period of reserved resources in the sensing window and measure a PSCCH RSRP in the resources periodically determined based on the PSCCH. Resources in which the PSSCH RSRP value exceeds a threshold may be excluded from the selection window. Thereafter, sidelink resources may be randomly selected from the remaining resources in the selection window.

Alternatively, received signal strength indication (RSSI) of periodic resources may be measured in the sensing window to grasp resources with little interference corresponding to the bottom 20%. In addition, sidelink resources may be randomly selected from the resources included in the selection window among the periodic windows. For example, when decoding of the PSCCH fails, such a method may be used.

For a detailed description thereof, refer to Section 14 of 3GPP TS 36.213 V14.6.0 document, which is incorporated herein as the related art of the present disclosure.

Transmission/Reception of PSCCH

Sidelink transmission mode 1 UE may transmit a PSCCH (or sidelink control signal or sidelink control information (SCI)) through resources configured by an eNB. Sidelink transmission mode 2 UE may receive resources which are configured by the eNB to be used for sidelink transmission. In addition, time/frequency resources may be selected from the configured resources to transmit a PSCCH.

Figure 8:
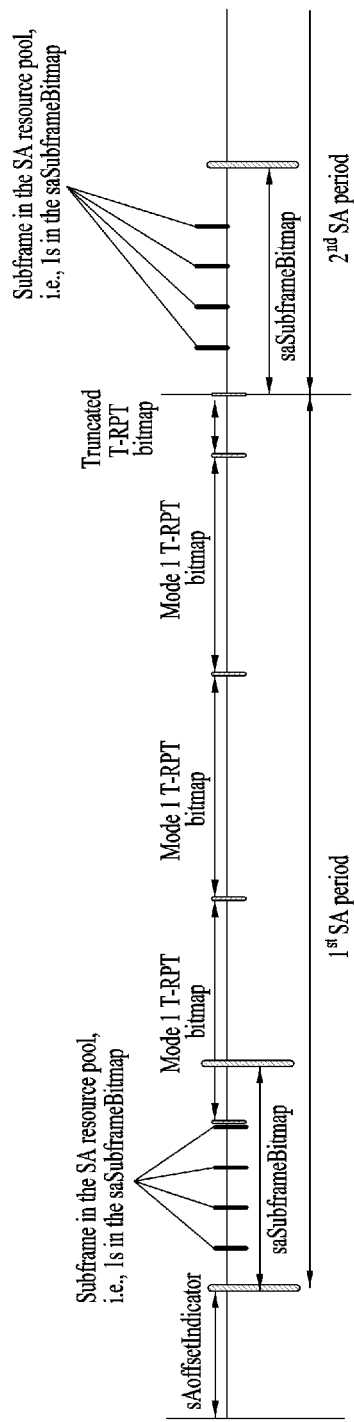
FIG. 8 is a view showing transmission of a sidelink PSCCH.

In sidelink transmission mode 1 or 2, a PSCCH period may be defined as shown in FIG. 8.

Referring to FIG. 8, a first PSCCH (or SA) period may start in a time resource unit separated from a specific system frame by a predetermined offset indicated by higher layer signaling. Each PSCCH period may include a PSCCH resource pool and a time resource unit pool for sidelink data transmission. The PSCCH resource pool may include a last time resource unit among time resource units indicated as transmission of a PSCCH in a time resource unit bitmap from a first time resource unit of a PSCCH period. In a resource pool for sidelink data transmission, in the case of mode 1, a time resource unit used for actual data transmission may be determined by applying time-resource pattern for transmission (T-RPT) or time-resource pattern (TRP). As shown in the figure, if the number of time resource units included in the PSCCH period excluding the PSCCH resource pool is greater than the number of T-RPT bits, T-RPT is repeatedly applicable and last applied T-RPT may be truncated by the number of remaining resource units and applied. A transmission UE performs transmission at a location where a T-RPT bitmap is 1 in the indicated T-RPT, and one MAC PDU is transmitted four times.

Figure 9:
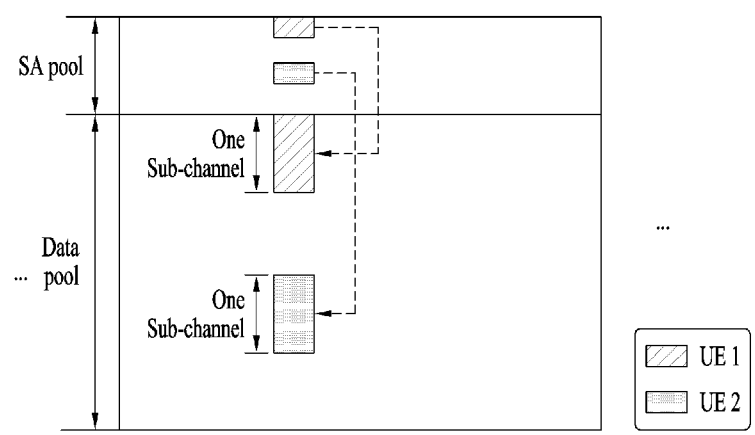
FIG. 9 is a view showing transmission of a PSCCH in sidelink V2X.
Figure 9:
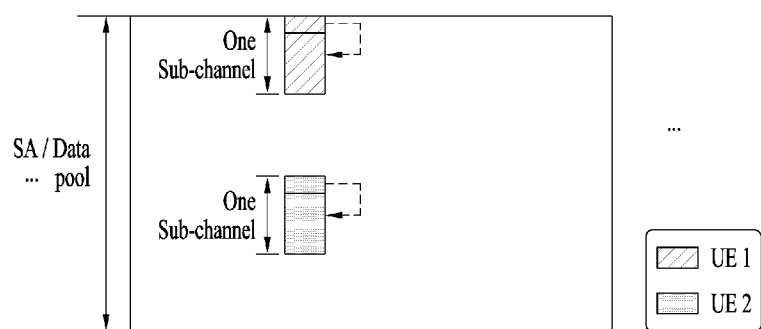

In the case of V2X, that is, sidelink transmission mode 3 or 4, unlike sidelink, a PSCCH and data (PSSCH) are transmitted using a FDM scheme. In V2X, because of the characteristics of vehicle communication, it is important to reduce delay. To this end, the PSCCH and data are FDM-transmitted on different frequency resources on the same time resources. FIG. 9 shows an example of such a transmission scheme. Any one of a scheme in which the PSCCH and the data are not directly contiguous as shown in FIG. 9(a) or a scheme in which the PSCCH and the data are directly contiguous as shown in FIG. 9(b) may be used. The basic unit of such transmission is a subchannel. The subchannel is a resource unit having a size of one or more RBs on a frequency axis on a predetermined time resource (e.g., a time resource unit). The number of RBs included in the subchannel, that is, the size of the subchannel and the start location on the frequency axis of the subchannel are indicated through higher layer signaling.

Meanwhile, in vehicle-to-vehicle communication, a periodic message type cooperative awareness message (CAM), an event triggered message type decentralized environmental notification message (DENM), etc. may be transmitted. The CAM may include vehicle dynamic state information such as a direction and a speed, vehicle static data such as dimensions and basic vehicle information such as external lighting states and a route history. The size of the CAM may be 50 to 300 bytes. The Cam may broadcast and latency needs to be less than 100 ms. The DENM may be generated in unexpected situations such as vehicle breakdown or accidents. The size of the DENM may be less than 3000 bytes, and all vehicles in a transmission range may receive the message. At this time, the DENM may have higher priority than the CAM. The message having higher priority may mean that the message having higher priority is preferentially transmitted when two messages need to be simultaneously from the viewpoint of one UE or mean that a message having higher priority among several messages is preferentially transmitted in terms of time. From the viewpoint of several UEs, a message having higher priority has less interference than a message having lower priority, thereby decreasing a reception error probability. Even in the CAM, the size of the message when security overhead is included may be larger than that of the message when security overhead is not included.

Sidelink Congestion Control

A sidelink communication wireless environment may be easily congested according to the density of vehicles, an increase in the amount of transmitted information, etc. At this time, various methods are applicable in order to reduce congestion. As an example, there is distributive congestion control.

In distributive congestion control, a UE grasps a congestion situation of a network and performs transmission control. At this time, congestion control considering priority of traffic (e.g., packets) is necessary.

Specifically, each UE measures a channel busy ratio (CBR) and determines a maximum value CRlimitk of a channel utilization CRk for each traffic priority (e.g., k) according to the CBR. For example, the UE may derive the maximum value CRlimitk of the channel utilization for each traffic priority based on the CBR measurement value and a predetermined table. In the case of traffic having relatively high priority, a larger maximum value of the channel utilization may be derived.

Thereafter, the UE may perform congestion control by limiting the total sum of the channel utilization of traffics having priority k lower than i to a certain value or less. According to this method, the channel utilization of traffics having relatively lower priorities is more strictly limited.

Besides, the UE may use size adjustment of transmit power, packet drop, determination of retransmission, transmission RB size adjustment (MCS adjustment), etc.

5G Use Cases

Three main requirement areas of 5G include (1) an enhanced mobile broadband (eMBB) area, (2) a massive machine type communication (mMTC) area and (3) an ultra-reliable and low latency communications (URLLC) area.

Some use cases may require a plurality of areas for optimization and the other use cases may focus upon only one key performance indicator (KPI). 5G supports various use cases using a flexible and reliable method.

eMBB is much superior to basic mobile Internet access and covers media and entertainment applications in rich interactive work, cloud or augmented reality. Data is one of key powers of 5G and, in the 5G era, a dedicated voice service cannot be seen for the first time. In 5G, voice is expected to be processed as an application program simply using data connection provided by a communication system. Main causes for increased traffic volume is an increase in the number of applications requiring a high data transfer rate and an increase in the size of content. Streaming services (audio and video), interactive videos and mobile Internet connections will be more widely used as more devices are connected to the Internet. Such many application programs require always-on connectivity in order to push real-time information and notification to users. Cloud storage and applications are rapidly increasing in mobile communication platforms, which are applicable to both work and entertainment. In addition, cloud storage is a special use case of leading growth of an uplink data transfer rate. 5G is also used for remote work in the cloud, and requires much lower end-to-end latency to maintain a good user experience when tactile interfaces are used. Entertainment, for example, cloud gaming and video streaming, is another key element for increasing the demand for mobile broadband capabilities. Entertainment is essential on smartphones and tablets at some places including a high mobility environment, such as trains, cars and airplanes. Another use case is augmented reality and information retrieval for entertainment. Herein, augmented reality requires very low latency and an instantaneous amount of data.

In addition, one of the most expected 5G use cases relates to a function capable of smoothly connecting embedded sensors in all fields, that is, mMTC. The number of potential IoT devices are expected to reach 20.4 billion by 2020. Industrial IoT is one of areas where 5G plays major roles in enabling smart cities, asset tracking, smart utilities, agriculture and security infrastructure.

URLLC includes new services which will change the industry through ultra reliability/available low latency links, such as remote control of important infrastructure and self-driving vehicles. The level of reliability and latency is essential for smart grid control, industrial automation, robotics and drone control and adjustment.

Next, a plurality of use cases related to 5G will be described in greater detail.

5G provides a stream rated from hundreds of megabits per second to gigabits per second and may complement fiber-to-the home (FTTH) and cable-based broadband (or DOCSIS). This high speed is required for transmission to TVs with resolution of 4K or higher (6K, 8K and higher) as well as virtual reality and augmented reality. Virtual reality (VR) and augmented reality (AR) applications include immersive sports events. Certain application programs may require special network settings. For example, in the case of VR games, game companies may need to integrate core servers with edge network servers of network operators in order to minimize latency.

Automobile is expected to be new important power in 5G along with many use cases for mobile communication of vehicles. For example, entertainment for passengers requires simultaneous high capacity and high mobile broadband. This is because future users will continue to expect high-quality connection regardless of the positions and speeds thereof. Another use case of the automotive field is an augmented reality dashboard. This identifies an object in the dark on top of what a driver sees through a windshield and displays the distance and movement of the object on information given to the driver. In the future, a wireless module will enable communication between vehicles, exchange of information between a vehicle and supporting infrastructure and exchange of information between a vehicle and other connected devices (e.g., devices carried by pedestrians). A safety system may lower the risk of accidents by guiding alternative courses of action to enable safter driving of the driver. A next step will be remote control or a self-driven vehicle. This requires very reliable and very fast communication between different self-driven vehicles and between a vehicle and infrastructure. In the future, a self-driven vehicle will perform all driving activities and a driver will focus only on traffic which cannot be identified by the vehicle itself. Technical requirements of the self-driven vehicle require ultra-low latency and ultrahigh-speed reliability to increase traffic safety to a level which cannot be achieved by human.

Smart cities referred to as smart society and smart home will be embedded with a high-density wireless sensor networks. Distributive networks of intelligent sensors will identify conditions for cost and energy-efficient maintenance of cities and home. Similar settings may be done for each home. Temperature sensors, window and heater controllers, burglar alarms and appliances are all wirelessly connected. Many of such sensors typically have low data transfer rates, low power and low cost. However, for example, real-time HD video may be required for a specific type of devices for surveillance.

Consumption and distribution of energy including heat or gas is highly decentralized and thus automated control of distributive sensor networks is required. In smart grid, such sensors are interconnected using digital information and communication technologies to collect information and act accordingly. This information may include behaviors of suppliers and consumers, allowing smart grid to improve efficiency, economics, sustainability of production and distribution of fuels such as electricity in an automated manner Smart grid may be regarded as another low-latency sensor network.

Heath sector has many application programs which may receive benefit of mobile communication. A communication system may support a remote medical service for providing clinical care far away. This may held in reducing barriers to distance and improve access to medical services which cannot be consistently available in remote rural areas. This is also used to save lives in critical medical treatment and emergencies. A wireless sensor network based on mobile communication may provide sensors and remote monitoring of parameters such as heart rate and blood pressure.

Wireless and mobile communication is becoming increasingly important in the industrial application fields. Wiring has high installation and maintenance costs. Accordingly, the possibility of replacing cables with reconfigurable wireless links is an attractive opportunity in many industries. However, achieving this requires wireless links which operate with latency, reliability and capacity similar to that of the cables, and simplified management. Low latency and very low error probability are new requirements for 5G connection.

Logistics and freight tracking are important use cases of mobile communication that enable tracking of package and inventory anywhere using a location-based information system. The use cases of logistics and freight tracking typically require low data rate but require a wide range and reliable location information.

Embodiment

A UE may receive predetermined reference signals (e.g., PRS) from fixed nodes (e.g., a base station, an RSU, a relay node, etc.) and calculate a difference in time for receiving the reference signals between the fixed nodes. At this time, when there is a sync difference between the fixed nodes, positioning accuracy of the UE may deteriorate. Here, the reference signal may be a positioning reference signal (PRS), and the PRS may mean a reference signal transmitted from a fixed node or a UE for the purpose of positioning.

In particular, for high-precision positioning, very precise synchronization between fixed nodes is necessary. For example, even synchronization error of 10 nanoseconds may cause positioning error of about 3 meters. However, precise synchronization with the fixed node by wire may significantly increase installation cost. In addition, precise synchronization with the fixed node by wire may have synchronization error which is technically difficult to be removed, such as cabling loss.

Accordingly, the present disclosure proposes a method of more precisely measuring the location of a UE by sharing a measurement result of a reference signal time difference (RSTD) between UEs, calculating a differential RSTD (or an RSTD difference) and removing synchronization error between fixed nodes using the same.

The present disclosure proposes a method of, by base station, efficiently receiving a positioning reference signal (e.g., UL PRS) transmitted by a UE using a UTDoA-based UE positioning scheme.

Figure 10:
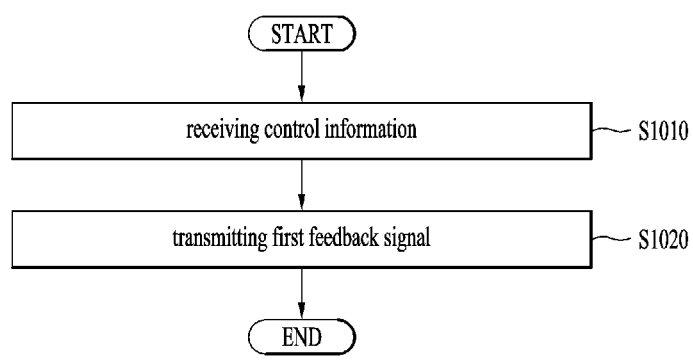
FIG. 10 is a flowchart illustrating an embodiment of the present disclosure.

FIG. 10 is a flowchart illustrating an embodiment of the present disclosure.

Referring to FIG. 10, a method of measuring a location of a first user equipment (UE) in a wireless communication system according to an embodiment of the present disclosure includes the first UE receiving control information from at least one of a plurality of base stations (e.g., a first base station and a second base station) (S1010) and the first UE transmitting a first reference signal to the plurality of base stations based on the control information (S1020). Here, the control information may include information indicating transmission of the first reference signal to the first UE with maximum power. In addition, the location of the first UE may be measured by the plurality of base stations based on the first reference signal. Meanwhile, information indicating a movement speed of the first UE may be transmitted from the first UE to at least one of the plurality of base stations. At this time, the first UE with the movement speed less than a threshold may be regarded as an anchor node by at least one of the plurality of base stations. In addition, the number of times of transmission of the reference signal may be determined based on path loss between a preset reference cell and the first UE.

In addition, the method of FIG. 10 may further include the first UE receiving a second reference from the plurality of base stations and receiving a third reference signal from a second UE, the first UE obtaining a difference between a first reception time when the second reference signal is received by the first UE and a second reception time when the third reference signal is received by the first UE, and the first UE obtaining a location of the second UE based on the difference between the first reception time and the second reception time. In addition, the method of FIG. 10 may further include the first UE transmitting information indicating the difference between the first reception time and the second reception time to at least one of the plurality of base stations. At this time, the location of the second UE may be obtained by the at least one base station based on the difference between the first reception time and the second reception time.

In addition, information including at least one of resource for transmission of the reference signal, a reference cell identifier used to derive path loss for each resource, a reference beam identifier, a reference signal identifier or an SSB index may be transmitted from the first base station to the second base station through backhaul signaling.

In addition, in the method of FIG. 10, at least one of time resource and frequency resource for transmission of the reference signal may be determined based on reference signal received power (RSRP) or transmit power for the reference signal.

In addition, in S1020, the reference signal may be transmitted by the first UE in a radio resource control (RRC) idle mode. That is, S1020 may be performed by the RRC idle mode UE.

Figure 11:
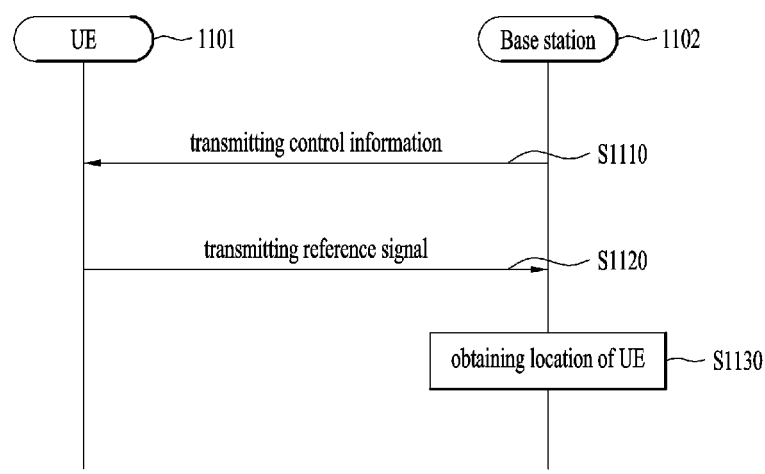
FIG. 11 is a flowchart illustrating an embodiment of the present disclosure.

FIG. 11 is a flowchart illustrating an embodiment of the present disclosure.

Referring to FIG. 11, a method of measuring a location of a UE 1101 in a wireless communication system according to an embodiment of the present disclosure includes at least one base station 1102 of a plurality of base stations transmitting control information to a UE 1101 (S1110); the UE 1101 transmitting a first reference signal to the plurality of base stations (or the at least one base station 1102) based on the control information (S1120); and the at least one base station 1102 obtaining/measuring/calculating the location of the UE 1101 based on the reference signal. Here, the control information may include information indicating transmission of the reference signal to the UE 1101 with maximum power.

The present disclosure proposes a method of better transmitting an uplink signal to a base station in a UTDoA-based UE positioning scheme.

In this regard, in the present disclosure, for convenience of description, several terms and variables are defined.

Anchor node (AN) is a node, a location of which is fixed, or accurate location information of which is known or can be known. When a moving UE knows the location of the anchor node in advance or when measurement information of a UE is signaled to a specific node, it may be assumed that the specific node knows the location of the anchor node. For example, the AN may be a base station or a UE. For example, the base station may regard a UE having a movement speed less than a threshold as an anchor node. As another example, the AN may be a UE at the beginning of installation and then may be a base station connected to a network through wireless backhaul after estimating the location thereof from another AN.

A UE may include a mobile device, a user equipment, a hand-held device, a mobile equipment and/or a vehicle device. This is a UE for measuring the location thereof by transmitting and receiving a signal to and from a AN. This may be a hand-held UE used by a pedestrian, a vehicle, or a specific type of node (e.g., a wireless AP, a wireless relay, etc.), a location of which is not determined but is fixed.

A PRS may be a signal transmitted by a UE and/or a AN for positioning. This signal is referred to as a positioning reference signal (PRS), for convenience of description. A PRS transmitted by a UE may be referred to as a UL PRS and a PRS transmitted by a AN may be referred to as a DL PRS.

Sidelink transmission mode 1 (sidelink mode 1) is a mode in which resource allocation is instructed by a base station. For example, this may be regarded as a centralized mode. Radio resource used for direct communication of a UE may be scheduled by a base station.

Sidelink transmission mode 2 (sidelink mode 2) may be a mode in which a UE determines radio resource for sidelink communication by itself.

An embodiment of the present disclosure proposes the following operation based on the above description.

PRS Power Control—1 Bit Indication of Max or Configured Power Transmission

In order for as many cell as possible to receive a signal from a UE, it is preferable that the UE transmits a PRS with maximum transmit power. However, this method may cause excessive interference with neighboring cells, and degrade reception performance of other PRSs, which are subjected to CDM/FDM and transmitted, due to near far effect. Here, the near far effect may mean a phenomenon wherein a signal from a distant UE is not received by a signal transmitted by a near UE. A near-far problem (or near-far effect) and/or hearability problem represents effect of strong signal from a near signal source which makes it difficult for a receiver to hear a weak signal from another signal source, which may occur due to adjacent-channel interference, co-channel interference, distortion, capture effect, dynamic range limitation, etc. Even if an OFDM waveform is used, interference may occur even in a non-allocated RB due to in-band emission. In addition, when UEs using the same time resource are far apart and receive powers at different frequencies are significantly different from the viewpoint of a reception UE, the above-described near far effect may occur. At this time, when UEs located at similar locations use the same time resource, the above-described near far effect can be reduced.

Accordingly, it is preferable that a UE transmits a PRS with maximum transmit power selectively only in special cases. When a network (e.g., a base station such as an eNB or gNB) or a server (e.g., a location server) needs to precisely know the location of a specific UE or when many base stations do not receive a UL PRS from a specific UE, the network or the server (e.g., the location server) may selectively signal an indication (e.g., 1 bit indication or max power indication) for transmitting a UL PRS to the UE with maximum transmit power. For such operation, the network or the server (e.g., the location server) may signal an indication for transmitting a PRS to a specific UE with maximum transmit power using a physical layer (e.g., a PDCCH) signal or a higher layer signal (e.g., MAC or RRC). Such operation may be applied to a specific UE or may be simultaneously applied to a specific UE group. When such operation applies to the specific UE, this indication signal may be signaled through a UE specific PDCCH. At this time, if transmission of a UL PRS with maximum transmit power causes excessive interference, in order to prevent this, predetermined transmit power may be indicated to be used in specific PRS resource. Here, transmit power may be fixed in advance or may be a power value signaled to a UE through an RRC or MAC control signal by a network.

If the location of a specific UE is precisely determined, a network (e.g., a base station such as an eNB or gNB) may improve positioning performance of the UE by using the UE, the location of which is grasped, as an anchor node.

An embodiment of the present disclosure may operate as follows.

Step 1) The base station (e.g., an eNB, a gNB, etc.) transmits a max power PRS to a specific UE (e.g., a target UE), thereby accurately grasping the location of the UE. To this end, the base station may transmit/transfer, to the UE, information indicating that a reference signal is transmitted with maximum power. At this time, when a UE with a large amount of movement is set as an anchor node, even if the location of the UE is accurately grasped, the UE may not function as the anchor node due to movement thereof. Accordingly, such indication may be limitedly performed for only a UE having a movement speed less than a certain threshold. To this end, the UE may report information on the movement speed thereof to the network. Alternatively, only a UE having the movement speed less than the certain threshold may follow the indication of max power PRS transmission. For example, information indicating the movement speed of the UE may be transmitted from the UE to at least one of a plurality of base stations. At this time, the UE having the movement speed less than the threshold may be regarded as an anchor node (AN) by at least one base station.

Step 2) The specific UE may transmit a specific reference signal according to the indication of the network. Here, the specific UE may be, for example, a target UE or a UE which wants to know the location thereof. In addition, the form of the reference signal may be, for example, a downlink (DL) reference signal, an uplink (UL) reference signal or a sidelink (SL) reference signal. At this time, timing when a specific reference signal is transmitted may be DL timing of a serving cell or UL timing. Here, DL timing may mean a reference time point at which an OFDM symbol boundary is derived based on a time point at which a DL signal is received. At this time, in the case of UL timing, the UE may signal a timing advance (TA) value thereof to neighboring UEs (through a physical layer or higher layer signal).

Step 3) A UE selected as an anchor node may receive signals transmitted by target UEs and estimate/measure/obtain final reception time points of the signals. At this time, a difference (e.g., RSTD) between a time point at which the signal (DL) of a base station is received and a time point at which a signal (e.g., DL, UL and/or SL) transmitted by another UE (e.g., a target UE) is received may be estimated/measured/calculated. However, in this case, unlike existing OTDoA, a difference in signal reception time between the base station and the other UE is measured. Through this operation, an ellipse centered on the base station and the anchor node may be made and, in this case, the target UE may be located on the trajectory of the ellipse. If three or more anchor nodes receive the signal from the target UE, the location of the target UE may be estimated/measured/calculated using three elliptic intersection points.

Step 4) The UE selected as the anchor node may transmit, to the base station (or the server), information indicating a time point at which the UE receives a signal (e.g., a reference signal or a PRS) from another UE (e.g., a target UE).

Step 5) The base station or the server (e.g., the location server) may estimate/measure/calculate the location of the target UE based on the information reported by the anchor node. In addition, the UE selected as the anchor node may estimate/measure/calculate the location of the target UE. In addition, the location estimated/measured/calculated by the server may be transmitted to the base station.

In an embodiment of the present disclosure, through the above operation, a UE may (accurately/efficiently) estimate/measure/calculate the location of the UE without receiving signals from a plurality of base stations.

In addition, the embodiment of the present disclosure proposes a UL PRS reference cell indication and backhaul signaling method.

If power control is performed with respect to the UL PRS based on pathloss of a specific cell, another cell may not receive the UL PRS well. However, when the L PRS is transmitted based on pathloss of another cell, excessive interference may occur in the serving cell.

In order to solve this, an embodiment of the present disclosure proposes a method of, by UEs belonging to a plurality of cells, transmitting a UL PRS several times based on pathloss of a specific cell. To this end, a method of signaling, by a base station, a cell (e.g., a reference cell) which is a criterion for pathloss measurement, a beam ID, a reference RS ID and/or an SSB index to a UE for each specific time resource (e.g., for each symbol or for each slot) or for each specific UL PRS resource set) is proposed. For example, the UE receives, from the base station, a common reference cell, a beam ID, a reference RS ID and/or an SSB index for each time resource in which the UL PRS is transmitted (e.g., for each symbol or for each slot) when transmitting the UL PRS, and transmits the UL PRS based on pathloss measured by at least one of a cell ID, a beam ID and a reference RS ID indicated by the network when transmitting the UL PRS in the corresponding symbol. In addition, to this end, it is necessary to align at least of a reference cell ID, a reference beam ID, a reference RS ID or an SSB index and time resource in which the UL PRS is transmitted between cells. Here, the time resource may be, for example, a symbol, a slot or a UL PRS resource set. Accordingly, cell ID information (e.g., a cell identifier), beam ID information (e.g., a beam identifier), reference RS ID information (e.g., a reference signal identifier) and/or an SSB index may be shared between base stations for each time resource for UL PRS transmission by wired/wireless backhaul signaling between the base stations. The above operation may be performed between specific cell groups and thus may be applied to UEs in a specific cell group.

UL PRS Timing Reference Cell Indication

A method of setting at least one of a reference cell ID, a reference beam ID, an RS ID and an SSB index for transmit power is extended and applicable to DL reference configuration for determining transmission timing. Similar to a UE measuring pathloss based on a specific cell/beam ID/RS ID/SSB index and performing power control, the UE may apply TA based on a reception time point of at least one of a specific cell ID, beam ID, RS ID and SSB index and transmit a UL PRS. At this time, a method of transmitting a TA command to a UE of another cell may be first considered, and, in this method, the TA command needs to be signaled to the UE of the other cell. To this end, the TA command of the other cell UE may be transmitted to a target gNB through backhaul signaling, and the target gNB may signal the received TA command to the cell UE thereof.

On the other hand, UEs of a specific cell may not accurately measure DL pathloss of another cell. In this case, a rough pathloss offset value may be set/indicated by the network. For example, pathloss of another cell may be estimated by applying an offset (value) to pathloss of a specific cell. By referring to the RRM report value of the UE, the network may signal the rough pathloss offset value to the UE through a physical layer or higher layer signal.

In addition, an embodiment of the present disclosure proposes a method of transmitting a RSRP based reference signal (e.g., RSRP based UL PRS tx).

Even in the UE of the same cell, the transmit powers of a UE located at the center of the cell and a UE located at the periphery of the cell may be significantly different by UL power control. When the UL PRS is received by the base station of another cell, the signal of the UE located at the center of the cell may not be smoothly received due to the UL power difference. Accordingly, a method of separating the transmit resource (e.g., time/frequency resource) of the UL PRS based on actual transmit power or RSRP when transmitting the UL PRS is proposed. If the UE is in an RRC connected mode and has rapidly performed an RSRP measurement report, since the network can know the RSRP measured by the UE, the network may instruct the specific UE to use resource for specific UL PRS transmission. However, in general, since the RSRP measurement report has a large latency time, excessively performing the RSRP measurement report for positioning (e.g., UTDoA positioning) is not preferable from the viewpoint of network operation. Accordingly, in this case, a method of, by the base station, selecting/configuring/setting a plurality of UL PRS resources and selecting/configuring/setting an available transmit power value or an RSRP upper limit value (or an RSRP lower limit) for each PRS resource, PRS symbol or PRS resource set, and, by the UE, selecting/configuring/setting resource for PRS transmission according to an instantaneous RSRP measurement result thereof is proposed.

Meanwhile, in a rapidly moving vehicle, switching to an RRC connected mode for precise positioning may cause signaling overhead and latency. Accordingly, in this case, a UE in an RRC idle mode also needs to transmit a UL PRS. In this case, at a UL PRS transmission time point, a UL PRS may be transmitted based on a signal reception time point of a DL reference cell, and information on a DL reference cell used by a UE belonging to a specific area/location/coverage may be signaled to the UE through a system information block (SIB) or RRC. Alternatively, the UL PRS may be transmitted based on the reception time point of GNSS. The network (e.g., a base station such as an eNB or gNB) may indicate a timing reference node type for each UL PRS resource. For example, a plurality of UL PRS resources is allocated, UL PRS resource A (e.g., first reference signal resource) may be used by a UE using GNSS as a timing reference and UE PRS resource B (e.g., second reference signal resource) may be used by a UE using a base station (e.g., an eNB or a gNB) as a timing reference.

Device(s) to which Various Embodiments of the Present Disclosure Applies

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
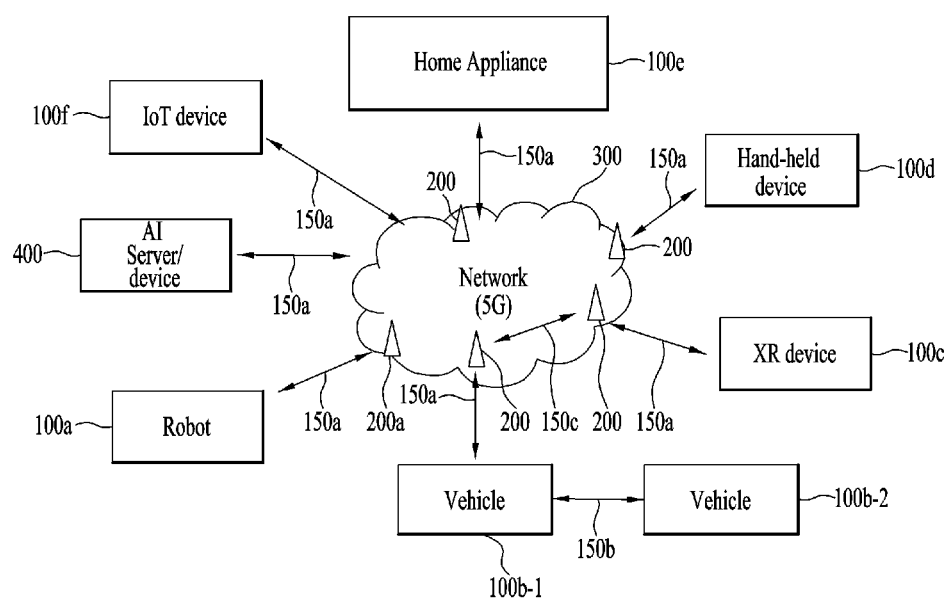
FIG. 12 is a view illustrating a communication system, to which an embodiment of the present disclosure applies.

FIG. 12 shows a communication system (1) in accordance with an embodiment of the present disclosure.

Referring to FIG. 12, a communication system to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An AI technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e g, channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 13:
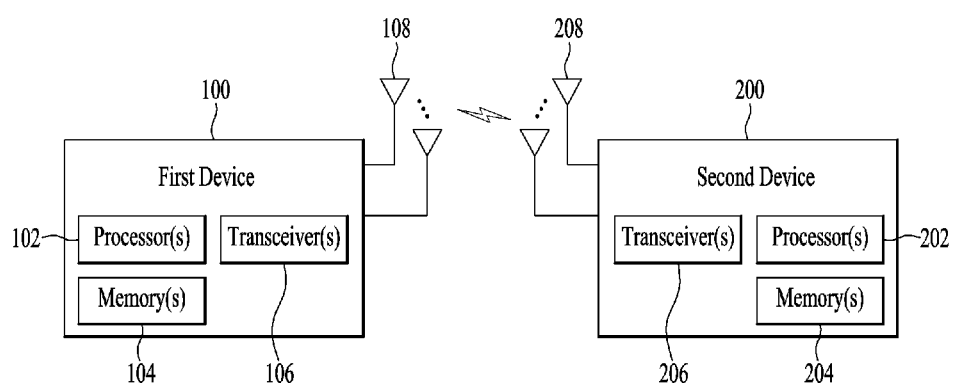
FIG. 13 is a block diagram illustrating a wireless device, to which an embodiment of the present disclosure is applicable.

FIG. 13 shows wireless devices in accordance with an embodiment of the present disclosure.

Referring to FIG. 13, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 12.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may be configured to perform at least one of the methods described above with reference to FIGS. 10 and 11. For example, the processor(s) (102) may be configured to control the transceiver(s) (106) to receive control information from at least one second wireless device (200) and to transmit a reference signal to the plurality of base stations based on the control information. Herein, the control information may include information indicating transmission of the reference signal to the first wireless device (100) with maximum power. In addition, the location of the first wireless device (100) may be configured to be measured by at least one second wireless device (102) based on the reference signal.

In addition, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Signal Processing Circuit Example to which the Present Disclosure is Applied

Figure 14:
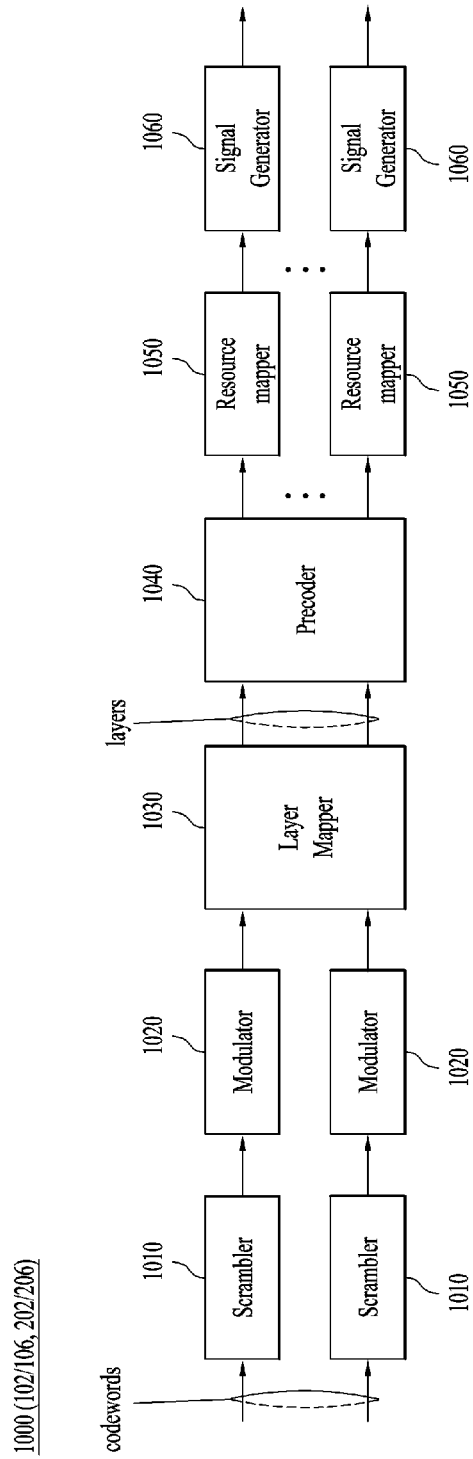
FIG. 14 is a view illustrating a signal processing circuit for a transmission signal, to which an embodiment of the present disclosure is applicable.

FIG. 14 shows a signal process circuit for a transmission signal in accordance with an embodiment of the present disclosure.

Referring to FIG. 14, a signal processing circuit (1000) may include scramblers (1010), modulators (1020), a layer mapper (1030), a precoder (1040), resource mappers (1050), and signal generators (1060). An operation/function of FIG. 14 may be performed, without being limited to, the processors (102, 202) and/or the transceivers (106, 206) of FIG. 13. Hardware elements of FIG. 14 may be implemented by the processors (102, 202) and/or the transceivers (106, 206) of FIG. 13. For example, blocks 1010-1060 may be implemented by the processors (102, 202) of FIG. 13. Alternatively, the blocks 1010-1050 may be implemented by the processors (102, 202) of FIG. 13 and the block 1060 may be implemented by the transceivers (106, 206) of FIG. 13.

Codewords may be converted into radio signals via the signal processing circuit (1000) of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010-1060) of FIG. 28. For example, the wireless devices (e.g., 100, 200 of FIG. 27) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Using Wireless Device, to which the Present Disclosure Applies

Figure 15:
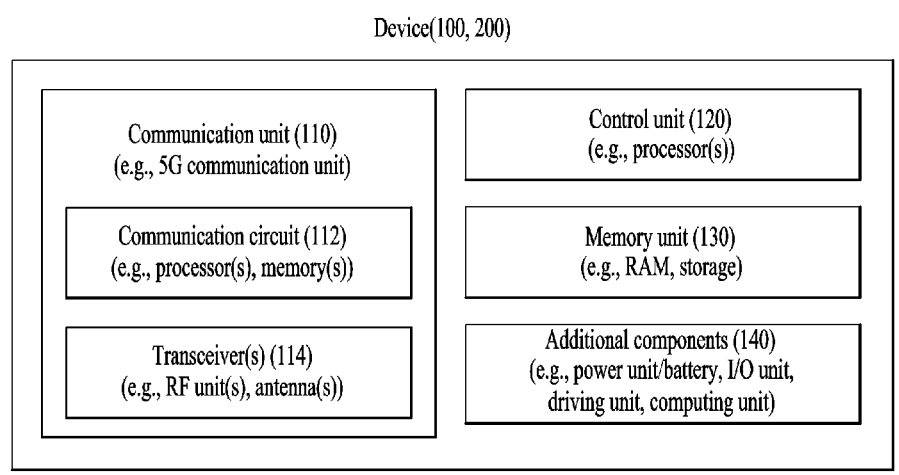
FIG. 15 is a block diagram showing a wireless device, to which an embodiment of the present disclosure is applicable.

FIG. 15 is a block diagram illustrating a wireless device, to which an embodiment of the present disclosure is applicable. The wireless device may be implemented in various forms according to a use-case/service (refer to FIGS. 12 and 16 to 18).

Referring to FIG. 15, wireless devices (100, 200) may correspond to the wireless devices (100, 200) of FIG. 13 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 13. For example, the transceiver(s) (114) may include the one or more transceivers (106, 206) and/or the one or more antennas (108, 208) of FIG. 13. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

For example, the control unit (120) may be configured to perform at least one of the methods described above with reference to FIGS. 10 and 11. For example, the control unit (120) may be configured to control the communication unit (110) to receive control information from at least one wireless device (200) and to transmit a reference signal to the plurality of base stations based on the control information. Herein, the control information may include information indicating transmission of the reference signal to the wireless device (100) with maximum power. In addition, the location of the wireless device (100) may be configured to be measured by at least one wireless device (200) based on the reference signal.

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Examples of Mobile Devices to which the Present Disclosure Applies

Figure 16:
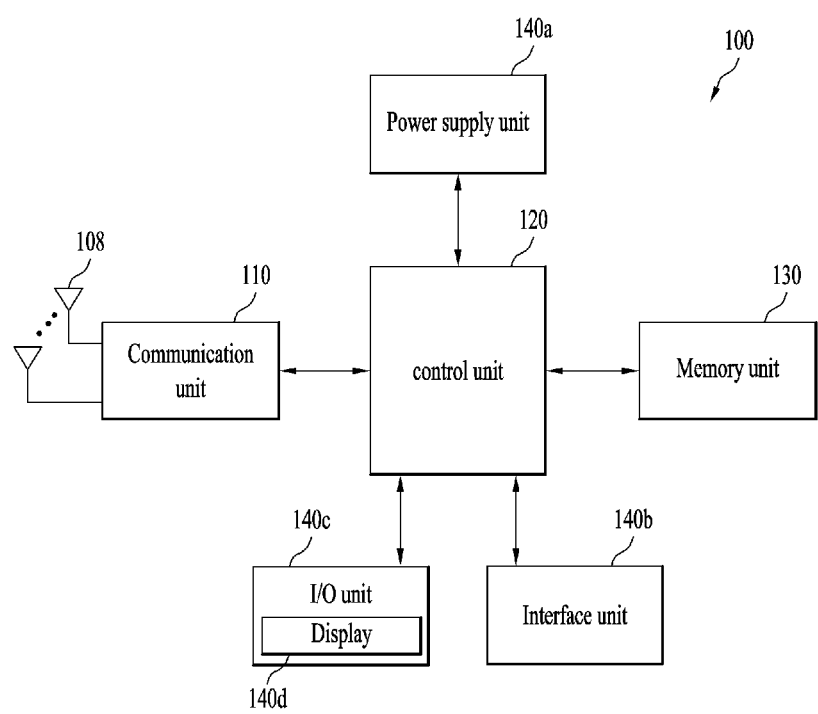
FIG. 16 is a block diagram showing a hand-held device, to which another embodiment of the present disclosure is applicable.

FIG. 16 shows a hand-held device in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 16, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a-140c correspond to the blocks 110~130/140 of FIG. 15, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 17:
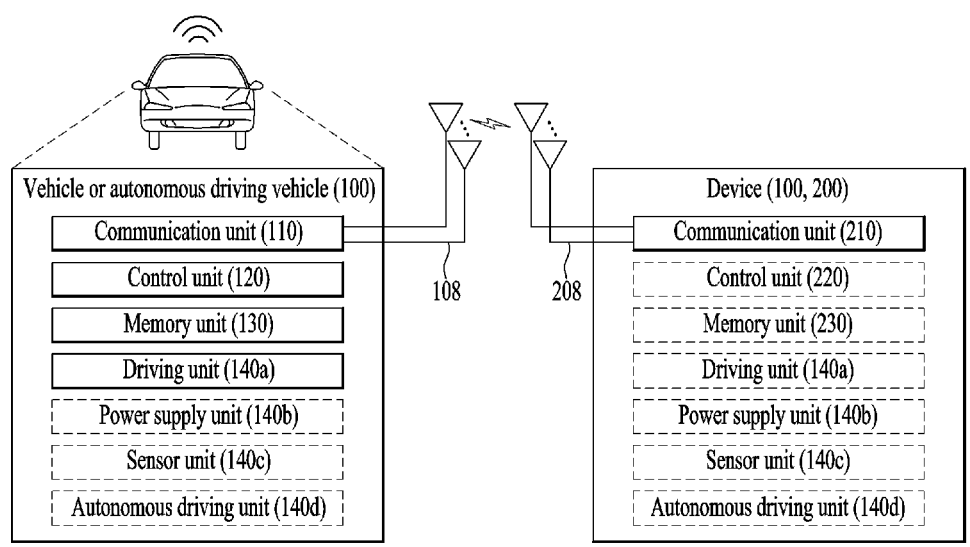
FIG. 17 is a block diagram showing a vehicle or an autonomous vehicle, to which another embodiment of the present disclosure is applicable.

Examples of Vehicles or Autonomous Vehicles to which the Present Disclosure Applies FIG. 17 shows a vehicle or an autonomous vehicle in accordance with an embodiment of the present disclosure. The vehicle or autonomous vehicle may be implemented by a mobile robot, a car, a train, a manned/unmanned Aerial Vehicle (AV), a ship, etc.

Referring to FIG. 17, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 15, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU).

For example, the control unit (120) may be configured to perform at least one of the methods described above with reference to FIGS. 10 and 11. For example, the control unit (120) may be configured to control the communication unit (110) to receive control information from at least one device (200) and to transmit a reference signal to the plurality of base stations based on the control information. Herein, the control information may include information indicating transmission of the reference signal to the vehicle or autonomous vehicle (100) with maximum power. In addition, the location of the vehicle or autonomous vehicle (100) may be configured to be measured by at least one device (200) based on the reference signal.

The driving unit (140a) may cause the vehicle or the autonomous vehicle (100) to drive on a road. The driving unit (140a) may include an engine, a motor, a powertrain, a wheel, a brake, a steering device, etc. The power supply unit (140b) may supply power to the vehicle or the autonomous vehicle (100) and include a wired/wireless charging circuit, a battery, etc. The sensor unit (140c) may obtain a vehicle state, ambient environment information, user information, etc. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

AR/VR and Vehicle Example, to which the Present Disclosure Applies

Figure 18:
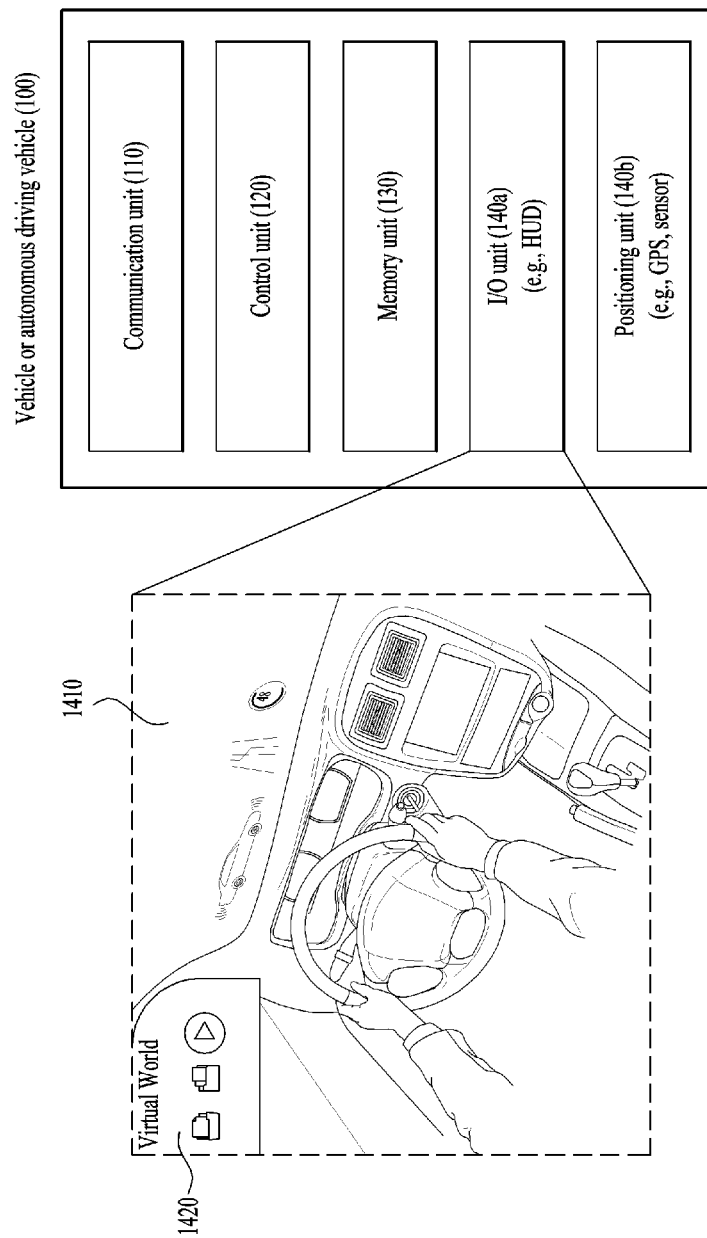
FIG. 18 is a view showing a vehicle, to which another embodiment of the present disclosure is applicable.

FIG. 18 is a view showing a vehicle, to which another embodiment of the present disclosure is applicable. The vehicle may be implemented as a transport means, an aerial vehicle, a ship, etc.

Referring to FIG. 18, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 15.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

In this disclosure, the embodiments of the present disclosure have been described centering on a data transmission and reception relationship between a UE and a BS. Such a transmission/reception relationship extends equally/similarly to signal transmission/reception between a terminal and a relay or between a base station and a relay. In this disclosure, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), gNode B (gNB), access point, etc. The term terminal may also be replaced with a user equipment (UE), a mobile station (MS) or a mobile subscriber station (MSS).

The embodiments of the present disclosure may be achieved by various techniques, for example, hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the implementations of the present disclosure may be implemented in the form of a module, a procedure, a function, etc. Software code may be stored in the memory unit and executed by the processor. The memory unit may be located inside or outside the processor and may transmit data to and receive data from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of measuring a location of a first user equipment (UE) in a wireless communication system, the method comprising:
   receiving, by the first UE, control information from at least one of a plurality of base stations; and
   transmitting, by the first UE, a first reference signal to the plurality of base stations based on the control information,
   wherein the control information comprises information indicating transmission of the first reference signal to the first UE with maximum power,
   wherein the location of the first UE is measured by the plurality of base stations based on the first reference signal,
   wherein information indicating a movement speed of the first UE is transmitted from the first UE to at least one of the plurality of base stations, and
   wherein the first UE with the movement speed less than a threshold is determined as an anchor node by at least one of the plurality of base stations.

2. The method of claim 1, further comprising:
   receiving, by the first UE, a second reference from the plurality of base stations;
   receiving, by the first UE, a third reference signal from a second UE;
   obtaining, by the first UE, a difference between a first reception time when the second reference signal is received by the first UE and a second reception time when the third reference signal is received by the first UE; and
   obtaining, by the first UE, a location of the second UE based on the difference between the first reception time and the second reception time.

3. The method of claim 2, further comprising; transmitting, by the first UE information indicating the difference between the first reception time and the second reception time to at least one of the plurality of base stations,
   wherein the location of the second UE is obtained by the at least one base station based on the difference between the first reception time and the second reception time.

4. The method of claim 1, wherein the number of times of transmission of the reference signal is determined based on path loss between a preset reference cell and the first UE.

5. The method of claim 1,
   wherein the plurality of base stations comprises a first base station and a second base station, and
   wherein information including at least one of resource for transmission of the reference signal, a reference cell identifier used to derive path loss for each resource, a reference beam identifier, a reference signal identifier or an SSB index is transmitted from the first base station to the second base station through backhaul signaling.

6. The method of claim 1, wherein at least one of time resource and frequency resource for transmission of the reference signal is determined based on reference signal received power (RSRP) or transmit power for the reference signal.

7. The method of claim 1, wherein the reference signal is transmitted by the first UE in a radio resource control (RRC) idle mode.

8. The method of claim 1, wherein the reference signal is a positioning reference signal (PRS).

9. A first user equipment (UE) of a wireless communication system, the first UE comprising:
   a transceiver; and
   a processor,
   wherein the processor is configured to;
   receive control information from at least one of a plurality of base stations; and transmit a first reference signal to the plurality of base stations based on the control information,
   wherein the control information comprises information indicating transmission of the first reference signal to the first UE with maximum power,
   wherein a location of the first UE is measured by the plurality of base stations based on the first reference signal,
   wherein information indicating a movement speed of the first UE is transmitted from the first UE to at least one of the plurality of base stations, and
   wherein the first UE with the movement speed less than a threshold is determined as an anchor node by at least one of the plurality of base stations.

10. The first UE of claim 9, wherein the first UE communicates with at least one of a mobile terminal, a network or an autonomous vehicle other than the device.

11. The first UE of claim 9, wherein the first UE performs an at least one advanced driver assistance system (ADAS) function based on a signal for controlling movement of the first UE.

12. The first UE of claim 9, wherein the first UE receives user input and switches a driving mode of a device from an autonomous mode to a manual mode or from a manual mode to an autonomous mode.

13. The first UE of claim 9,
wherein the first UE is autonomously driven based on external object information, and
wherein the external object information comprises at least one of information on presence/absence of an object, location information of the object, information on a distance between the first UE and the object or information on a relative speed between the first object and the object.

* * * * *